Dec. 22, 1942.  T. G. McMANUS  2,306,219
HYDRAULIC PACKING GLANDS
Filed Feb. 19, 1942
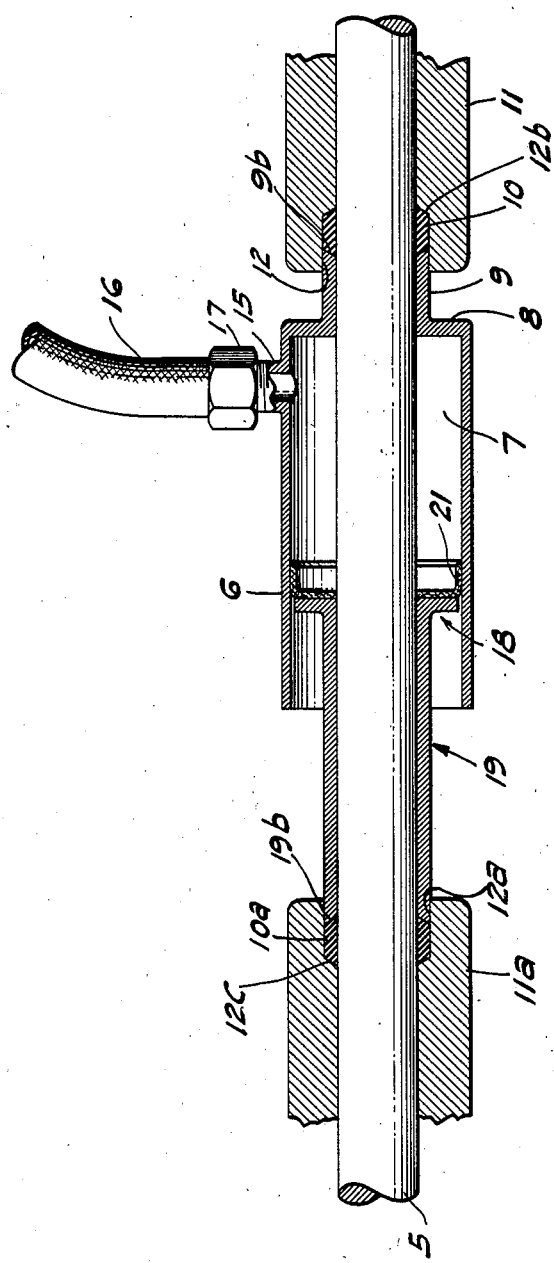
Inventor
Thomas G. McManus Patented Dec. 22, 1942

2,306,219

UNITED STATES PATENT OFFICE 2,306,219

HYDRAULIC PACKING GLAND

Thomas G. McManus, Downey, Calif.

Application February 19, 1942, Serial No. 431,500

4 Claims. (Cl. 286—13)

This invention relates to a hydraulic packing gland.

The packing gland structure provided by this invention may be advantageously used in a great variety of situations, but is particularly well adapted for use in a pump for handling liquid chemicals of a kind apt to injure the packing in packing glands as heretofore constructed, for example in pumping hot caustic soda, corrosive chemicals, sand and the like.

Speaking more specifically of the nature of the packing gland structure provided by the invention, said structure is of a pressure controlled character and is arranged to reduce the friction of a shaft which passes through a pair of spaced apart bearings, each of said bearings being provided with a stuffing box, there being around the shaft a lubricant chamber located in the space between said stuffing boxes and supplies lubricant to them both, under pressure.

It is an object of the invention to simplify a packing gland structure of the kind above stated and also provide for a quicker, more convenient renewal of the packing material whenever that becomes necessary.

Other objects, advantages and features of invention will hereinafter appear.

Referring to the accompanying drawing which illustrates what is at present deemed to be a preferred embodiment of the invention.

The view shows an embodiment of the device partly in section and partly in side elevation, end portions of the structure shown being broken away in order to contract the view.

Referring in detail to the drawing, the invention is shown applied to a shaft or rod 5 which may either rotate or reciprocate, but will likely be the rotatable shaft of a pump used to dispense caustic soda or other chemicals from a reservoir.

Concentrically around said shaft is a pressure cylinder 6 containing a channel 7 which is filled with a lubricating fluid under pressure. Said cylinder is open at one end and at its opposite end is provided with a head 8, outwardly from which projects a tubular extension 9 the axis of which coincides with the axis of the cylinder 6.

A bearing member 11 which may be a part of a pump casting is fitted around the right hand portion of the shaft section shown, the passage through said member having a diametrical enlargement 12 throughout its left end portion which forms a recess within the outer part of which the aforesaid tubular extension 9 fits with a close working fit. Within the inner part of this recess is a packing 10 which is compressed by said extension 9.

Near its head 8 the cylinder 6 is provided with an inlet extension 15 to which is attached a pressure supply hose 16 by means of a fitting 17. Said flexible hose may be connected with any suitable stationary fluid pressure supply means, and will accommodate itself to movement of the cylinder 7 caused by wearing away of the packing 10. The end of the cylinder 6 farthest from its head 8 is open to provide for the inserting and removing the head 18 which is carried by the tubular piston rod 19. Said head 18 is provided with a cup shaped gasket 21 which prevents leakage from the chamber 7 around the piston head.

At its outer end said piston rod cooperates with a bearing member 11a in some particulars shaped like, but positioned reversely to, the aforementioned bearing member 11 that is located at the opposite side of the piston and cylinder structure. In the portion of the bearing member 11a that is directed toward the other said bearing member there is, around the shaft 5, an annular packing recess 12a, the inner portion of which contains a packing 10a which is compressed by the tubular piston rod 19.

By preference and as shown, the end of the tubular extension is inwardly beveled at 9b and the outer end of the tubular piston rod 19 is inwardly beveled at 19b. Also at the bottom of the recess 12 there is a bevel 12b, and at the bottom of the recess 12a there is a bevel 12c. These four bevels cooperate to crowd the packing material into a closer contact with the shaft 5.

The rod of the piston 19 and extension 9 of the piston cylinder 6 constitute two tubular members which act as followers in opposite directions to compress the packing in the two stuffing-boxes with which the bearings are provided.

In the operation of the device a lubricating liquid will be supplied to the piston cylinder chamber 7 under a pressure slightly greater than any pressure tending to force into the stuffing-boxes (more particularly the packing 12b) liquid being pumped by the rotary pump assumed to be driven by the shaft 5. Therefore, in case a chemical is being pumped, none of it will enter said stuffing-boxes and injure the packing in them, but the packing will last a long time without requiring renewal owing to it being supplied with lubricant, as well as by excluding the chemicals therefrom. However, renewal of the packing, whenever necessary is easily accomplished by withdrawing fluid pressure from the cylinder 6, whereupon the two tubular followers 9 and 19 can be withdrawn from the stuffing-boxes and new packings supplied, and this can be done without removing the device from its surrounding relation to the shaft 5. This is an important feature of the invention, in view of the fact packing glands similar to those shown in the drawing have necessarily been frequently supplied with fresh packing.

It should be understood that the present disclosure is for the purpose of illustration only and that this invention includes all modifications and equivalents which fall within the scope of the subject matter claimed.

What is claimed is:

1. In a packing structure, the combination with a shaft; of a cylindrical member concentrically surrounding said shaft thereby providing an annular chamber therearound, said cylindrical member having a closure head at one end from which projects a tubular extension which surrounds said shaft with a working fit, a member surrounding said shaft with a working fit adjacent to said extension, said last recited member having an annular, open-mouthed recess around said shaft into the outer part of which said tubular extension projects with a working fit, there being a compressible packing within the inner part of said recess, a tubular piston rod having a head with a working fit in the end portion of said cylindrical member which is opposite to its aforesaid extension, a second member for said shaft, said second member being located in a spaced relation to the end of said cylindrical member opposite to the first recited member, said second member having around the shaft a recess containing a compressible packing and the outer end of said tubular piston rod projecting into said recess to compress said packing, and means to supply lubricant under pressure to the interior of said cylinder.

2. A structure of the kind described comprising a shaft, two members surrounding different portions of the length of said shaft, each of said members having, in the part thereof which is directed toward the other, an annular recess surrounding said shaft, compressible packings occupying the inner portions of said recesses, two follower members to compress said packings, each of said follower members surrounding said shaft and being slidable therealong in a telescopic relation to said shaft and to each other, one of said follower members having a tubular portion acting upon the packing in one of said recesses and the other of said follower members having a tubular portion acting upon the packing in the other of said recesses, and fluid pressure operable means whereby said follower members are forced away from each other to cause them to compress the two packings aforesaid, said fluid pressure operable means including a piston and cylinder surrounding said shaft, one of said tubular members consisting of an extension from one end of said cylinder, and the other of said tubular members being the rod of a piston operating in said cylinder.

3. In a packing structure, the combination with a shaft; of a cylinder concentrically surrounding said shaft thereby providing an annular chamber therearound, said cylinder having a closure head at one end from which projects a tubular extension which surrounds said shaft with a working fit, a member surrounding said shaft with a working fit adjacent to said extension, said member having around said shaft an annular, open-mouthed recess into the outer part of which said tubular extension projects with a working fit, there being a compressible packing within the inner part of said recess, a tubular piston rod having a head with a working fit in the end portion of said cylinder which is opposite to its aforesaid extension, such end portion of said cylinder being open to permit the complete withdrawal of the head of said piston therefrom, a second member for said shaft located in an outwardly spaced relation to the open end of said cylinder, a packing for the latter member surrounding said shaft, and follower means for said packing forming a part of the recited piston structure.

4. In a packing structure, the combination, with a shaft; of a hollow member surrounding said shaft thereby providing a chamber therearound, said hollow member having a closure head at one end provided with an extension, a member for said shaft adjacent to said extension, a packing for the last recited member, said packing being compressible by said extension, a piston rod having a head with a working fit in that end portion of said cylinder which is opposite to said extension, such end of said cylinder being open to permit the complete withdrawal of said piston therefrom, a second member for said shaft located in an outwardly spaced relation to the open end of said cylinder, a packing for the latter member surrounding said shaft, follower means for said packing forming a part of the recited piston structure, and means to supply a lubricating liquid under pressure to the interior of said hollow member to lubricate said shaft and automatically adjust the pressure on said closure head and said piston head simultaneously, said hollow member and piston rod being slidable relatively to each other and to said shaft upon which they operate.

THOMAS G. McMANUS.